(12) United States Patent
Ohyama et al.

(10) Patent No.: US 6,397,810 B2
(45) Date of Patent: Jun. 4, 2002

(54) BALANCER-FITTING CONFIGURATION FOR AN INTERNAL COMBUSTION ENGINE

(75) Inventors: Takashi Ohyama; Shinji Kuga; Ryuji Tsuchiya; Tetsuaki Maeda, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/789,491

(22) Filed: Feb. 22, 2001

(30) Foreign Application Priority Data

Feb. 22, 2000 (JP) ........................................ 2000-045214

(51) Int. Cl.[7] ............................................... F02B 75/06
(52) U.S. Cl. .................................................... 123/192.2
(58) Field of Search ....................................... 123/192.2

(56) References Cited

U.S. PATENT DOCUMENTS 5,860,402 A * 1/1999 Sakurai et al. ........... 123/192.2

FOREIGN PATENT DOCUMENTS

JP 10073148 A 3/1998

* cited by examiner

Primary Examiner—Noah P. Kamen
(74) Attorney, Agent, or Firm—Birch, Stewart, Kolasch & Birch, LLP (57) ABSTRACT

To provide a balancer-fitting configuration for an internal combustion engine. With the balancer-fitting configuration of the present invention, the vibration control of an internal combustion engine with forward-inclined cylinders is achieved effectively by using paired balancers separated and disposed opposite to each other. Furthermore, the part of the crankcase behind the crankshaft is decreased in size in the longitudinal direction of the frame, and thereby, a space within which the rear wheel swings is obtained without enlarging the frame. A balancer-fitting configuration of an internal combustion engine with a crankcase, a crankshaft, and a crank weight for a vehicle with a rear wheel disposed close to the rear of the crankcase, wherein the cylinder axial line of the internal combustion engine is inclined generally horizontally, and paired balancers, one above and the other below the crankshaft, are disposed generally within the maximum width of the locus of the crank weight in the longitudinal direction of the vehicle. Furthermore, a starter is disposed in the vicinity of the upper balancer, and accessories such as an oil pump are disposed in the vicinity of the lower balancer.

20 Claims, 9 Drawing Sheets

BALANCER-FITTING CONFIGURATION FOR AN INTERNAL COMBUSTION ENGINE

BACKGROUND OF THE INVENTION

1. Field of the Invention

The present invention relates to a balancer-fitting configuration for an internal combustion engine.

2. Description of Background Art

The cylinders of some known internal combustion engines are inclined forward and paired balancers, one above and the other below the crankshaft, are disposed within the maximum width of the locus of the crank weight in the longitudinal direction of the vehicle which is fitted with the internal combustion engine. For example, Japanese Unexamined Patent Publication No. 10-73148 discloses such an internal combustion engine.

Figure 10:
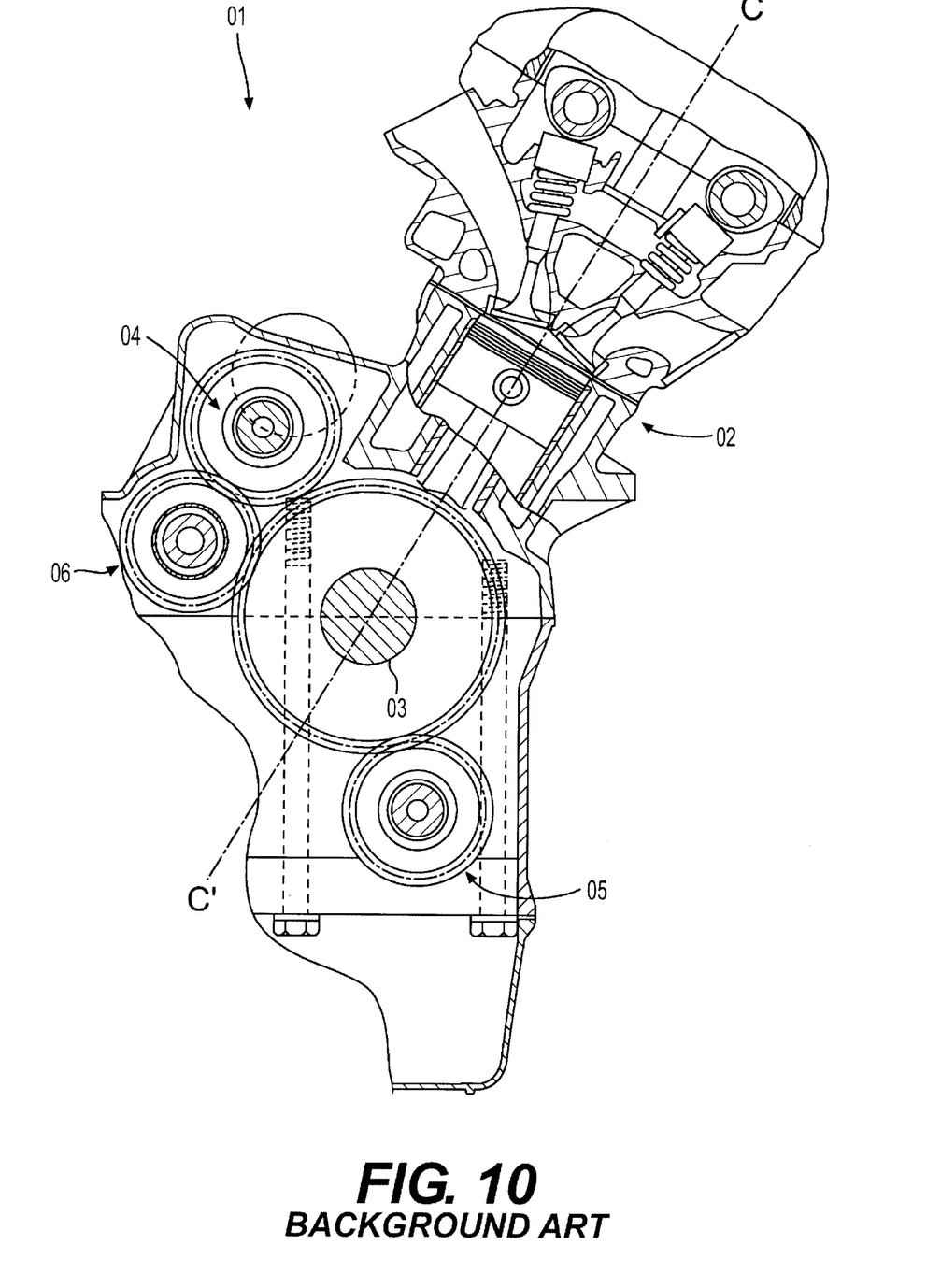
FIG. 10 is a cross-sectional view of a principal part of a conventional internal combustion engine.

As shown in FIG. 10 of the present invention, the internal combustion engine 01 disclosed in the above patent publication has a cylinder 02 which is inclined a little forward and balancers 04 and 05 which are disposed generally above and below a crankshaft 03, within the maximum width of the locus of the crank weight of the crankshaft 03 in the longitudinal direction of the vehicle which is fitted with the internal combustion engine 01. Thus, the length of the internal combustion engine in the longitudinal direction of the vehicle is decreased in size.

Because the cylinder axial line C–C' is inclined only a little forward, the balancers 04 and 05 disposed generally above and below the crankshaft 03 are not positioned symmetrically in relation to the cylinder axial line C–C'.

Accordingly, the rotation of the upper and lower balancers 04 and 05 acts, as a moment, on the crankshaft 03 to become an additional factor of vibration.

In the case of the above patent publication, to rotate the upper balancer 04, an idler gear 06 is located between the crankshaft 03 and the balancer 04. Thus, the rotation of the crankshaft 03 is transmitted through the idler gear 06 to the upper balancer 04 to rotate it in the same direction as the crankshaft 03.

Because the idler gear 06 is disposed between the crankshaft 03 and the upper balancer 04 and protruding backward relatively to them, the part of the crankcase behind the crankshaft 03 is bulky. Accordingly, the rear wheel has to be disposed more backward to avoid the interference between the crankcase and the rear wheel, making the frame large.

SUMMARY OF THE INVENTION

The present invention was made in view of the above problem. Accordingly, an object of the present invention is to provide a balancer-fitting configuration for an internal combustion engine. With the balancer-fitting configuration of the present invention: (i) the vibration control of an internal combustion engine with forward-inclined cylinders is achieved effectively by using paired balancers separated and disposed opposite to each other; (ii) the part of the crankcase behind the crankshaft is decreased in the longitudinal direction of the frame; and (iii) a space within which the real wheel swings is obtained without enlarging the frame.

To achieve the above object, in accordance with a first aspect of the present invention, there is provided a balancer-fitting configuration for an internal combustion engine with a crankcase, a crankshaft, and a crank weight for a vehicle with a rear wheel disposed close to the rear of the crankcase, wherein: (i) the cylinder axial line of the internal combustion engine is inclined generally horizontally, and paired balancers, one above and the other below the crankshaft, are disposed generally within the maximum width of the locus of the crank weight in the longitudinal direction of the vehicle; and (ii) a starter is disposed in the vicinity of the upper balancer, and accessories such as an oil pump are disposed in the vicinity of the lower balancer.

Because the cylinder axial line is inclined generally horizontally and paired balancers, one above and the other below the crankshaft, are disposed generally within the maximum width of the locus of the crank weight in the longitudinal direction of the vehicle, the balancers can be positioned symmetrically in relation to the cylinder axial line, with the crankshaft being the center between the balancers.

Accordingly, the rotation of the upper and lower balancers does not cause a moment to the crankshaft. Accordingly, vibration can be effectively controlled with the paired balancers separated from each other without being concerned about an additional factor effecting vibration.

Because the paired balancers are within the maximum width of the locus of the crank weight in the longitudinal direction of the vehicle, the part of the crankcase behind the crankshaft can be decreased in size in the same direction. In addition, the starter and the oil pump are disposed in the vicinity of the balancers. Thus, the length of the internal combustion engine including the starter and the oil pump can be decreased in size, and a space in which the rear wheel swings behind the crankcase can be obtained without enlarging the frame.

In accordance with a second aspect of the present invention, there is provided a balancer-fitting configuration of an internal combustion engine as in the first aspect of the present invention, wherein the shaft of the upper balancer is disposed behind the crankshaft and the starter is disposed before the upper balancer shaft.

Because the starter is disposed before the upper balancer shaft which is disposed behind the crankshaft, the starter does not excessively protrude upward. In addition, because the starter is positioned within the maximum width of the locus of the crank weight in the longitudinal direction of the vehicle, the starter does not protrude forward. Thus, the internal combustion engine can be made compact.

In accordance with a third aspect of the present invention, there is provided a balancer-fitting configuration of an internal combustion engine as in the first aspect of the present invention, wherein the accessories such as an oil pump are disposed before the shaft of the lower balancer.

Because the accessories are disposed before the lower balancer shaft, the accessories do not affect the ground clearance of the frame.

In accordance with a fourth aspect of the present invention, there is provided a balancer-fitting configuration for an internal combustion engine as in any of the first through third aspects of the present invention, wherein the rear wheel which is disposed close to the rear of the crankcase is journaled on an axle at the rear end of an arm which swings about a shaft in axial alignment with the crankshaft.

An internal combustion engine with cylinders inclined generally horizontally tends to be long. However, the distance from the internal combustion engine to the rear wheel can be shortened by configuring the crankshaft and the arm supporting the rear wheel at its rear end so that the arm can swing about a shaft in axial alignment with the crankshaft. Thus, the frame can be made small in length.

In accordance with a fifth aspect of the present invention, there is provided a balancer-fitting configuration for an internal combustion engine comprising: a crankcase; a crankshaft; and a balancer which has a shaft parallel to the crankshaft, wherein (i) a driving gear fitted on the crankshaft and a balancer driven gear fitted on the balancer shaft engage with each other to transmit motive power; (ii) the balancer driven gear is a scissors gear comprising two spur gears which are put together side by side and urged to slip out of the exactly overlapping state of the tooth profiles of one spur gear and those of the other; and (iii) a positioning pin fixes the two spur gears of the balancer driven gear in the exactly overlapping state of the tooth profiles of one spur gear and those of the other and positions the balancer driven gear with respect to the crankcase.

Because the balancer driven gear is a scissors gear, the rotation is transmitted smoothly.

Because the positioning pin fixes the two spur gears in the exactly overlapping state of the tooth profiles of one spur gear and those of the other and positions the balancer driven gear with respect to the crankcase, the phase matching of the balancer can easily be made when it is built in the internal combustion engine. Thus, the assembling efficiency is raised significantly.

In accordance with a sixth aspect of the present invention, there is provided a balancer-fitting configuration of an internal combustion engine as in the fifth aspect of the present invention, wherein (i) a through hole is made at a position on the crankcase corresponding to the position of the positioning pin and (ii) the positioning pin can be removed through the through hole.

Because the positioning pin can be removed through the through hole of the crankcase after the balancer is built in the internal combustion engine, the assembling efficiency is high.

In addition, a worker can be prevented from forgetting to remove the positioning pin after building it in the internal combustion engine by configuring the positioning pin so that it checks the rotation of the internal combustion engine unless it is removed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Referring to FIGS. 1 to 9, an embodiment of the present invention will be described below.

Figure 1:
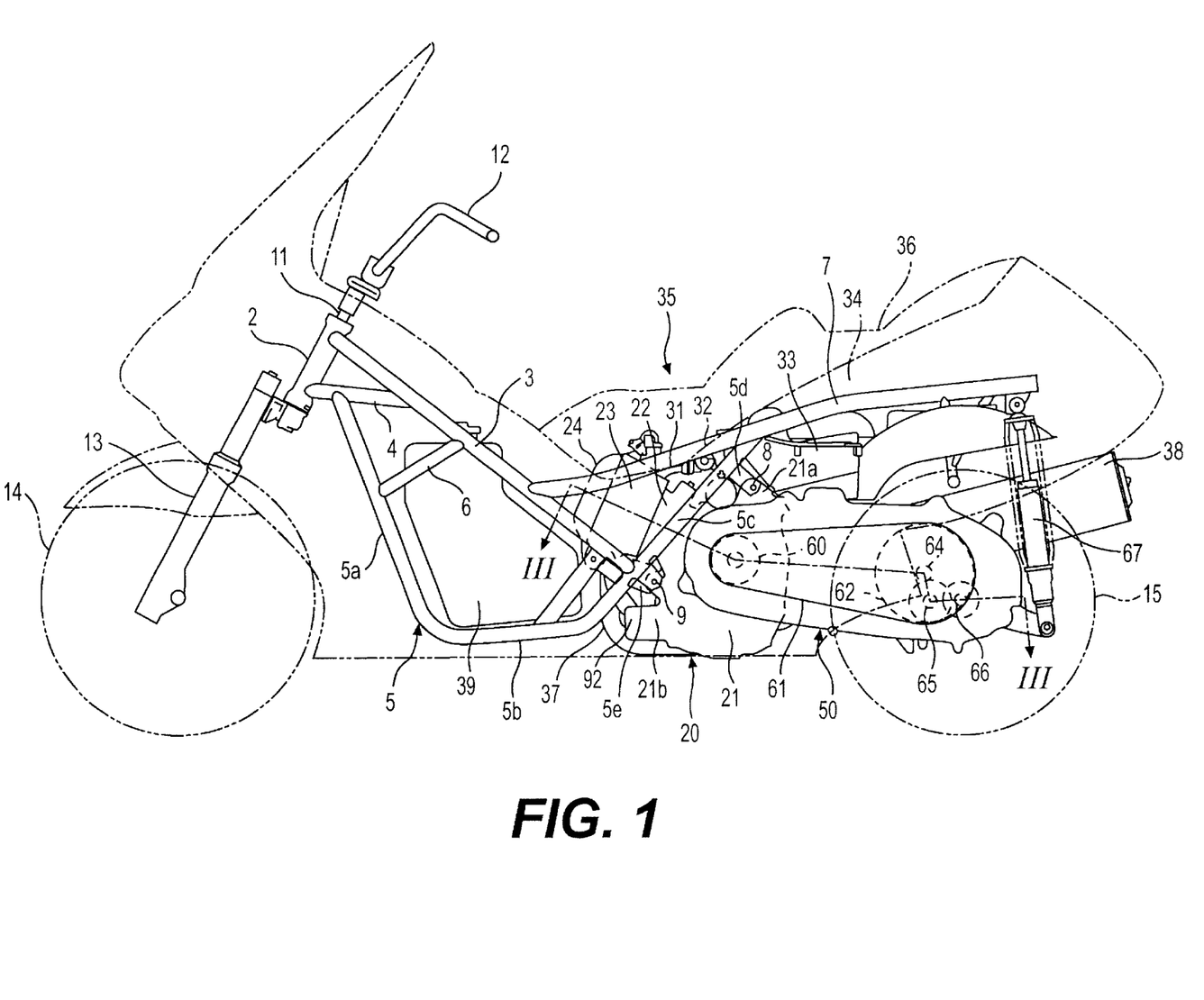
FIG. 1 is a entire side view of a scooter-type motorcycle to which an internal combustion engine of an embodiment of the present invention is applied.
Figure 2:
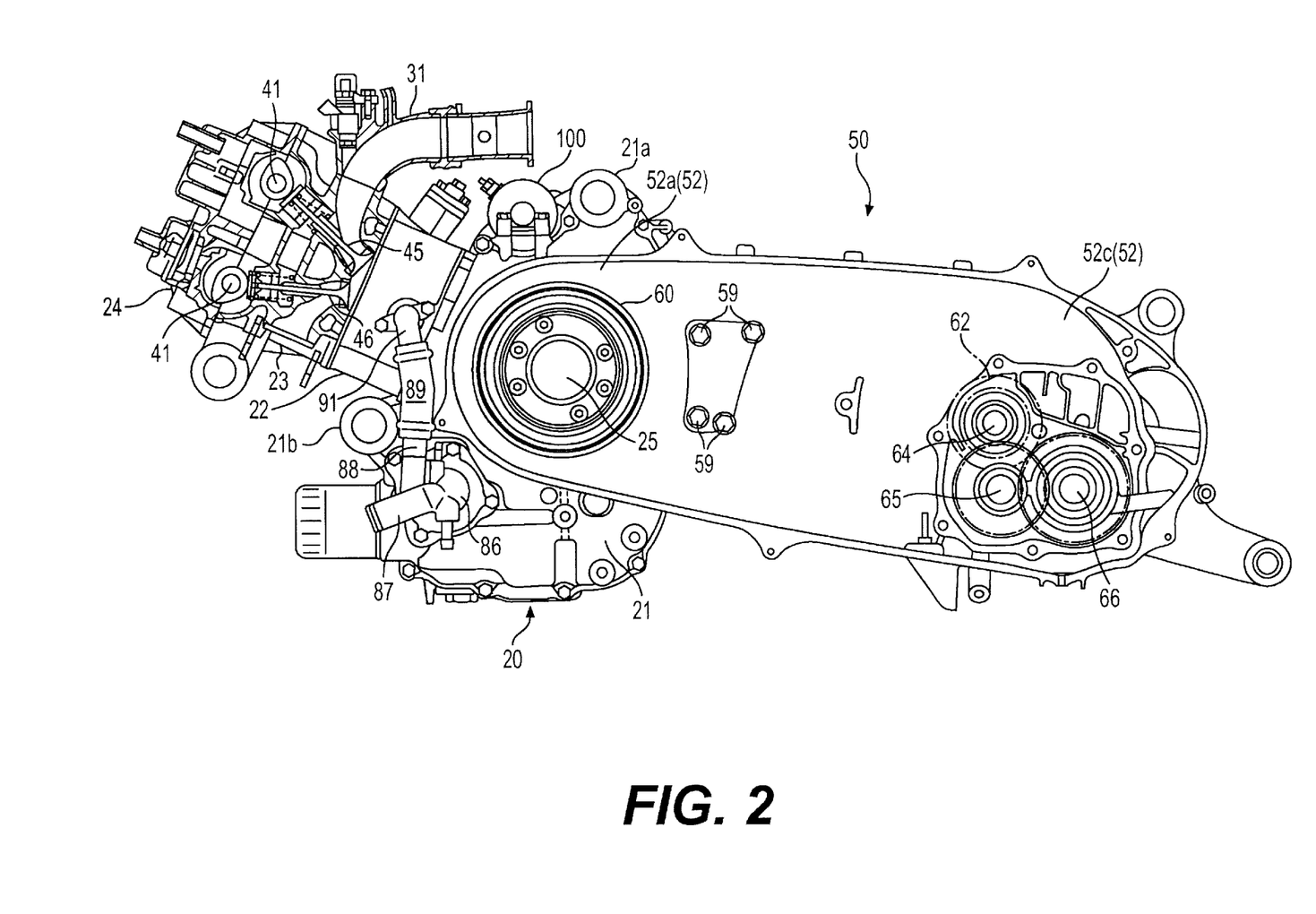
FIG. 2 is a side view of an internal combustion engine and a belt-type automatic transmission partially sectioned and partially omitted.

An internal combustion engine in accordance with an embodiment of the present invention is applied to a scooter-type motorcycle 1, an entire side view of which is shown in FIG. 1.

Regarding the frame of the scooter-type motorcycle 1, a pair of main pipes 3 and 3 extends backward, downward straight from the upper part of a head pipe 2 as seen from the left side. A pair of right and left support pipes 4 and 4 extends generally horizontally, backward from the lower part of the head pipe 2 to connect with the main pipes 3 and 3. The right and left support pipes 4 and 4 support front parts of the main pipes 3 and 3.

From the middle parts of the support pipes 4 and 4, paired right and left down pipes 5 and 5 extend downward at an acute angle, the space between them expanding, to form front vertical sections 5a and 5a. At the bottoms of the front vertical sections 5a and 5a, the down pipes 5 and 5 bend backward to form middle horizontal sections 5b and 5b. At the rear ends of the middle horizontal sections 5b and 5b, the down pipes 5 and 5 bend upward to form rear slant sections 5c and 5c.

The rear ends of the main pipes 3 and 3 are connected with the lower parts of the rear slant sections 5c and 5c, the main pipe 3 and the down pipe 5 forming a triangular shape as seen from each side of the frame. A reinforcing pipe 6 is connected between the main pipe 3 and the down pipe 5 on each side.

On each side of the frame, a seat rail 7, of which the front end is fixed to a part of the main pipe 3 located slightly behind the center of the main pipe 3, extends backward, slightly upward to the rear of the frame. On each side of the frame, the upper end of the rear slant section 5c of the down pipe 5 is connected with the middle part of the seat rail 7 to support it.

A steering shaft 11 is journaled in the head pipe 2. Formed above the head pipe 2 are handlebars 12 and 12 extending right and left, respectively. Extending below the head pipe 2 is a front fork 13. A font wheel 14 is journaled on a shaft at the bottom of the front fork 13.

On each side of the frame, supporting brackets 5d and 5e facing backward are provided at the upper and lower parts, respectively, of the rear slant section 5c of the down pipe 5. An internal combustion engine 20 is suspended from the pair of right and left supporting brackets 5d and the pair of right and left supporting brackets 5e.

The internal combustion engine 20 is of the four-stroke cycle type and has two cylinders. A crankcase 21 is disposed behind the rear slant sections 5c of the down pipes 5. A cylinder block 22, a cylinder head 23, and a cylinder head cover 24 are placed, one on top of another in the order of their description, on the crankcase 21 and joined together, the assembly of the cylinder block 22, the cylinder head 23, and the cylinder head cover 24 taking a largely forward-inclined posture and protruding beyond the rear slant sections 5c of the down pipes 5.

The cylinder block 22, the cylinder head 23, and the cylinder head cover 24 are disposed between the right and left triangles formed by the rear slant sections 5c of the down pipes 5, the rear parts of the main pipes 3, and the front parts of the seat rails 7 on the right and left sides of the frame. A mounting bracket 21a protruding from the top of the crankcase 21 and another mounting bracket 21b protruding from the front of the crankcase 21 are supported by the supporting brackets 5d and 5e, respectively, through the media of supporting shafts 8 and 9, respectively. Thus, the internal combustion engine 20 is suspended from the frame.

A belt-type automatic transmission 50 is pivoted at its front to the crankcase 21 of the internal combustion engine 20 and extends backward. A rear wheel 15 is journaled at the rear of the belt-type automatic transmission 50.

Intake pipes 31 and 31 extend upward from the cylinders of the forward-inclined cylinder head 23 of the internal combustion engine 20 and bend backward to connect with carburetors 32 and 32 disposed laterally side by side, above the crankcase 21. The carburetors 32 and 32 connect with an air cleaner 33 disposed behind them.

The air cleaner 33 is disposed between the right and left seat rails 7 and 7. Above the air cleaner 33, a helmet-containing box 34 is supported by the seat rails 7 and 7.

A rider's seat 35 is disposed freely openable and closable over the internal combustion engine 20 and the carburetors 32, and a pillion 36 is disposed freely openable and closable over the helmet-containing box 34 and the part behind it.

Exhaust pipes 37 and 37 extend from the cylinder head 23 downward, go to the right in front of the crankcase 21, extend further backward along the right side of the crankcase 21, and join into a single pipe, which goes upward, backward along the right side of the frame and connects with a muffler 38 supported on the right side of the rear wheel 15.

In front of the internal combustion engine 20, a fuel tank 39 is enclosed and supported by the four pipes; i.e., the upper right and left main pipes 3 and 3 and the front and lower, right and left down pipes 5 and 5.

The above is the general construction of the scooter-type motorcycle 1.

The belt-type automatic transmission 50, which is pivoted at its front to the crankcase 21 of the internal combustion engine 20, will now be described below.

Figure 3:
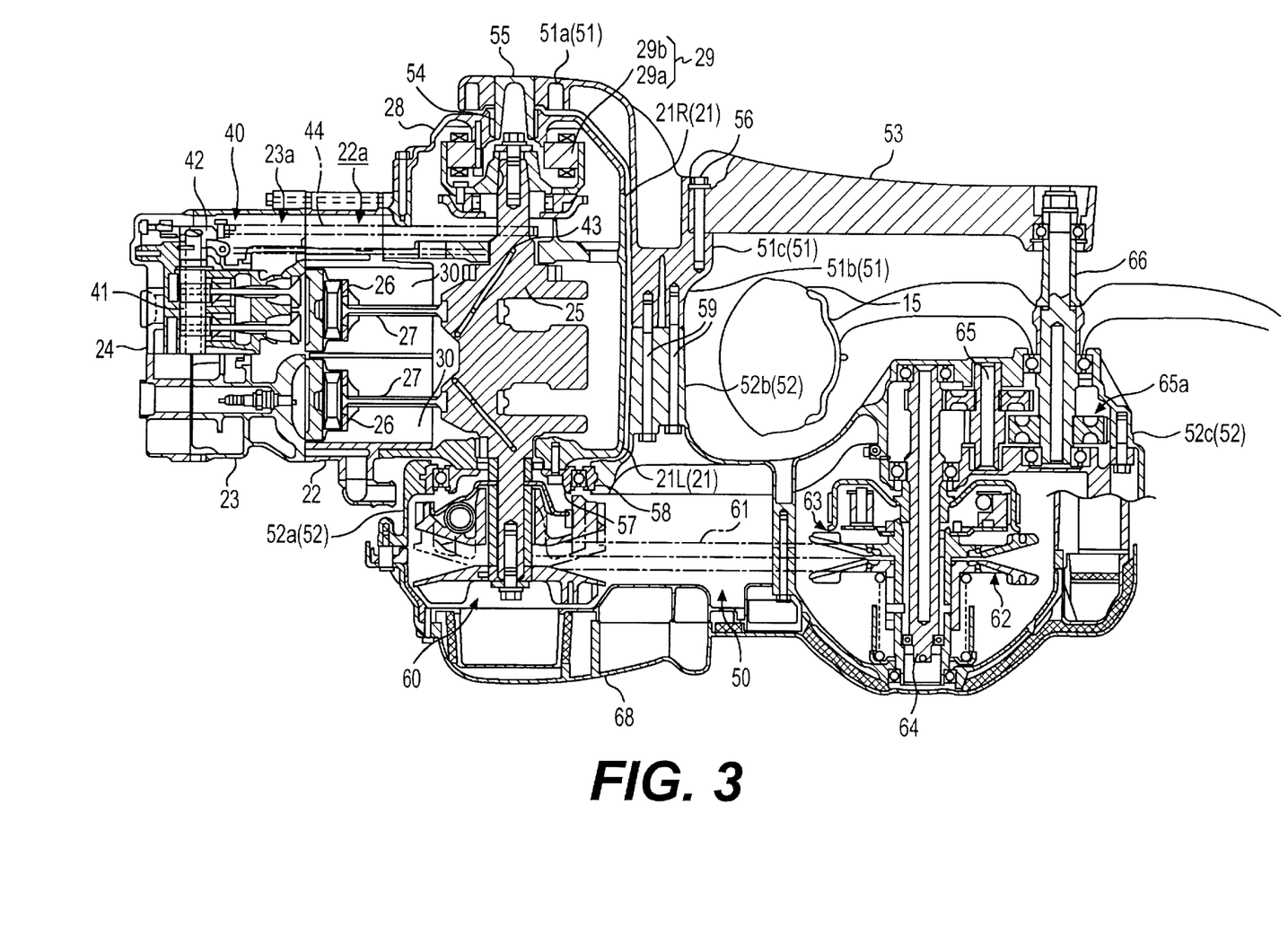
FIG. 3 is a cross-sectional view of the device in FIG. 1 sectioned along the line III—III of FIG. 1.

The crankcase 21 is split into right and left halves 21R and 21L. As shown in FIG. 3, a crankshaft 25 is disposed horizontally, laterally relatively to the frame, in the crankcase 21. The outer rotor 29a of an AC generator 29 is fitted on the right end of the crankshaft 25. A case cover 28 is fitted to the right crankcase half 21R to cover the side of the outer rotor 29a. The inner stator 29b of the AC generator 29 is supported on the case cover 28.

Pistons 26 and 26, which slidingly reciprocate in two cylinder sleeves 30 in the cylinder block 22, are connected to crank pins of the crankshaft 25 through connecting rods 27 and 27. The crank pins have a phase shift of 360 degrees.

The cylinder head 23 is provided with a valve system 40. Camshafts 41 and 41 are disposed horizontally, laterally relatively to the frame, one up and one down. Cam-chain sprocket wheels 42 and 42 are fitted on the right ends of the camshafts 41 and 41. A drive-chain sprocket wheel 43 is fitted on a part of the crankshaft 25 protruding through the right crankcase half 21R immediately outside of the right crankcase half 21R. A timing chain 44 is wound around the drive-chain sprocket wheel 43 and the cam-chain sprocket wheels 42 and 42 to transmit the motive power from the former to the latter.

The timing chain 44 is wound through cam-chain chambers 22a and 23a formed on the right side of the cylinder block 22 and the cylinder head 23. The camshafts 41 and 41 drive inlet valves 45 and the exhaust valves 46 in accordance with prescribed timing.

The belt-type automatic transmission 50 is pivoted to the crankcase 21 of the internal combustion engine 20.

The case cover 28, which closes the right opening of the right crankcase half 21R and covers the AC generator 29, has an opening coaxial with the crankshaft 25. A rotation shaft 55 is supported in the opening through a bearing 54 so as to protrude to the right of the case cover 28. A base end part 51a of a right transmission-case section 51 of the belt-type automatic transmission 50 is fitted on the protruding part of the rotation shaft 55.

The right transmission-case section 51 includes a connecting part 51b which extends from the base end part 51a, bends inwardly, and extends further along the back of the right crankcase half 21R.

Bosses 51c, which protrude backward, are formed at two locations on the back of the connecting part 51b. Two left-facing joints, or joining faces, on the front end of a right fork member 53 are brought and fitted to two right-facing joints, or joining faces, on the bosses 51c and they are secured to each other by bolts 56. Thus, the right fork member 53 is joined to the right transmission-case section 51 and extends backward.

In addition, the left end of the crankshaft 25 protrudes through a left crankcase half 21L. A drive pulley 60 with a centrifugal speed-changing mechanism is fitted on the protruding part of the crankshaft 25.

An annular supporting member 57 is fixed on the outer surface of the left crankcase half 21L, around the crankshaft 25 protruding through the left crankcase half 21L. A left transmission-case section 52 is pivoted at its base end part 52a about the annular supporting members 57 through a bearing 58 so as to be freely swingable.

The left transmission-case section 52 includes a connecting part 52b which extends from a base end part 52a, bends inwardly, and further extends along the back of the left crankcase half 21L. The left transmission-case section 52 also includes a left fork part 52c which extends backward.

A joint, or joining face, of the connecting part 51b of the right transmission-case section 51 which bends inwardly from the right side of the crankcase 21 and extends along the back of the crankcase 21 and a joint, or joining face of the connecting part 52b of the left transmission-case section 52 which bends inwardly from the left side of the crankcase 21 and extends along the back of the crankcase 21 are brought and fitted to each other and secured to each other by four bolts 59. Thus, the right and left transmission-case sections 51 and 52 are joined together, and thereby the left fork part 52c and the right fork member 53 are connected together as a unit, each taking its position opposite to that of the other.

Because the right transmission-case section 51 is pivoted so as to swing freely about the crankshaft 25 through the bearing 54 and the left transmission-case section 52 is pivoted so as to swing freely about the crankshaft 25 through the bearing 58, the left fork part 52c and the right fork member 53 are supported so as to swing, as a unit, up and down freely about the crankshaft 25.

The rear portion of the left fork part 52c of the left transmission-case section 52 constitutes a transmission chamber. A driven shaft 64 is journaled in the transmission chamber. A driven pulley 62 is journaled about the driven shaft 64 through a centrifugal clutch 63.

A V-belt 61 is wound around the driven pulley 62 and the drive pulley 60 described earlier to constitute a belt-type speed-changing mechanism.

Provided in the transmission chamber of the left fork part 52c is a speed-reducing mechanism of a transmission gear group 65a, wherein driving force is transmitted from the driven shaft 64 through a countershaft 65 to an axle 66.

The axle 66 is provided between the left fork part 52c and the right fork member 53 so as to be freely rotatable, and the rear wheel 15 is supported by the axle 66 between the left fork part 52c and the right fork member 53.

Accordingly, the right and left transmission-case sections 51 and 52, wherein the belt-type automatic transmission 50 is supported, are pivoted so that the left fork part 52c, the right fork member 53, and the rear wheel 15 can swing freely about the crankshaft 25.

Since the rear wheel 15 and the crankshaft 25 are configured so that the former swings about the latter, the distance from the internal combustion engine 20 to the rear wheel 15 can be decreased. Thus, the frame can be decreased in length.

A rear cushion 67 or shock absorber is fitted between the rear end of the left transmission-case section 52 and the rear end of the seat rail 7.

A belt cover 68 closes the left opening of the left transmission-case section 52 containing the belt-type automatic transmission 50 and covers the belt-type automatic transmission 50 from its left side.

The internal combustion engine 20 has paired balancer shafts 71 and 72, one above and the other below the crankshaft 25.

Figure 5:
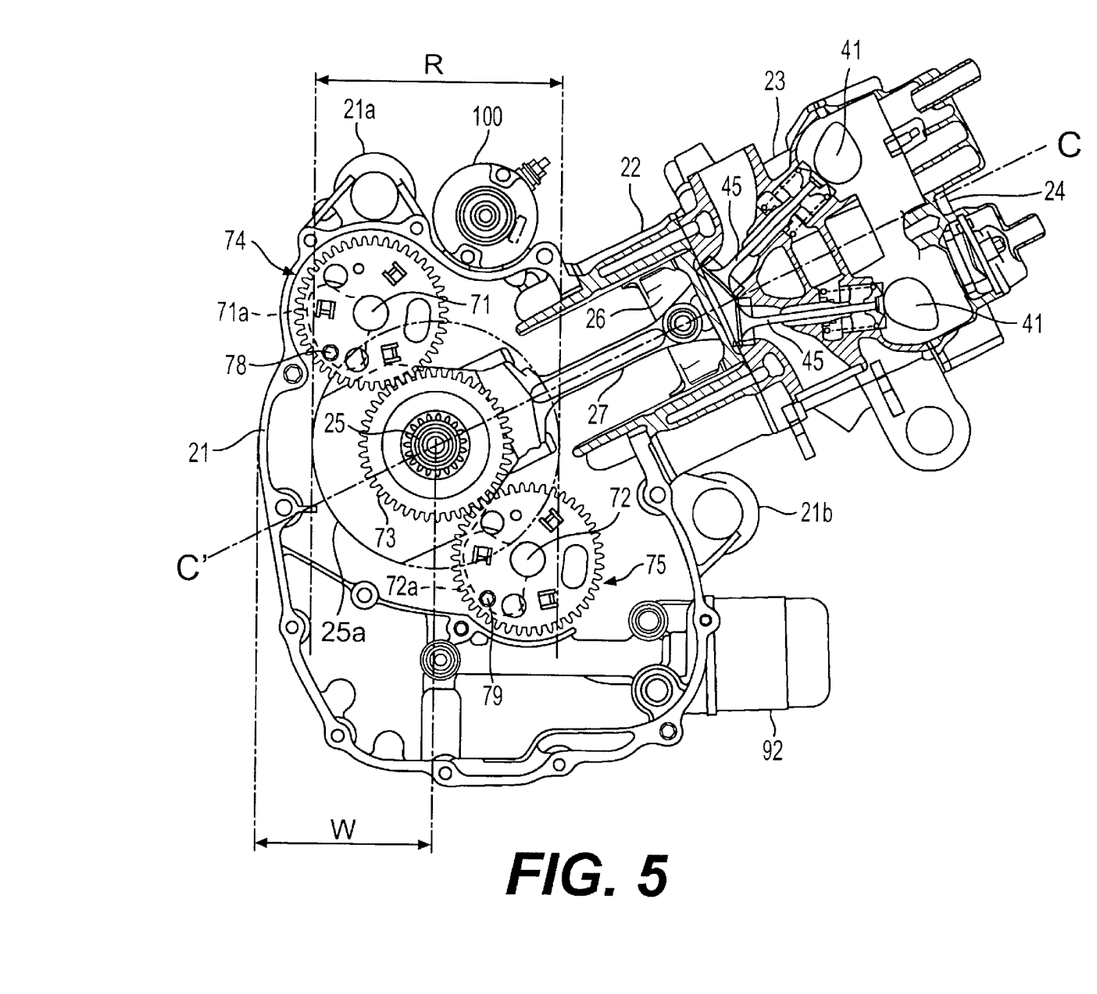
FIG. 5 is a right side view of an internal combustion engine having a right crankcase half which is removed.

Referring to FIG. 5, since the cylinder axial line C–C' of the internal combustion engine 20 is substantially inclined, the upper and lower balancer shafts 71 and 72 are disposed generally symmetrical in relation to the cylinder axial line C–C'.

Although the upper balancer shaft 71 is disposed slightly behind the crankshaft 25 and the lower balancer shaft 72 is disposed slightly before the crankshaft 25, both balancers 71a and 72a are within the maximum width "R" of the rotational locus of a crank weight 25a of the crankshaft 25, the width "R" taken in the longitudinal direction of the frame.

A driving gear 73 is fitted on the crankshaft 25, adjacent the inner surface of the right crankcase half 21R. Balancer driven gears 74 and 75, which are fitted on the balancer shafts 71 and 72, respectively, engage simultaneously with the driving gear 73. Accordingly, while the crankshaft 25 is rotating, both of the balancer shafts 71 and 72 rotate in the same direction.

Since the cylinder axial line C–C' is inclined nearly horizontally and the paired balancers 71a and 72a are separated and placed in positions generally symmetrical in relation to the cylinder axial line C–C', the crankshaft 25 being the center between them, the rotation of the upper and lower balancers 71a and 72a does not cause a moment to the crankshaft 25. Thus, vibration can be effectively controlled with the separated-two-shaft balancer mechanism without concern of an additional effect on vibration.

Since the paired balancers 71a and 72a are disposed above and below the crankshaft 25, respectively, and generally within the maximum width "R" of the rotational locus of the crank weight 25a in the longitudinal direction of the frame, the distance "W" from the crankshaft 25 to the rear wall of the crankcase 21 can be decreased.

As described earlier, the crankshaft 25 and the rear wheel 15 are configured so that the latter swings about the former. Accordingly, the distance from the internal combustion engine 20 to the rear wheel 15 and, hence, the overall length of the frame can be reduced further by bringing the rear wheel 15 close to the crankcase 21, since the distance "W" from the crankshaft 25 to the rear wall of the crankcase 21 is reduced. Thus, the frame can be made compact, and a space in which the rear wheel 15 swings can be obtained behind the crankcase 21.

A mounting bracket 21a which protrudes from the crankcase 21 is provided directly above the upper balancer shaft 71. A starter motor 100 is disposed before the mounting bracket 21a. Since the heavy components of the starter motor 100 and the upper balancer 71a are disposed near the mounting bracket 21a (refer to FIGS. 4 and 5), the moment of inertia around the engine support is small, which is advantageous in limiting the vibration of the frame.

Figure 4:
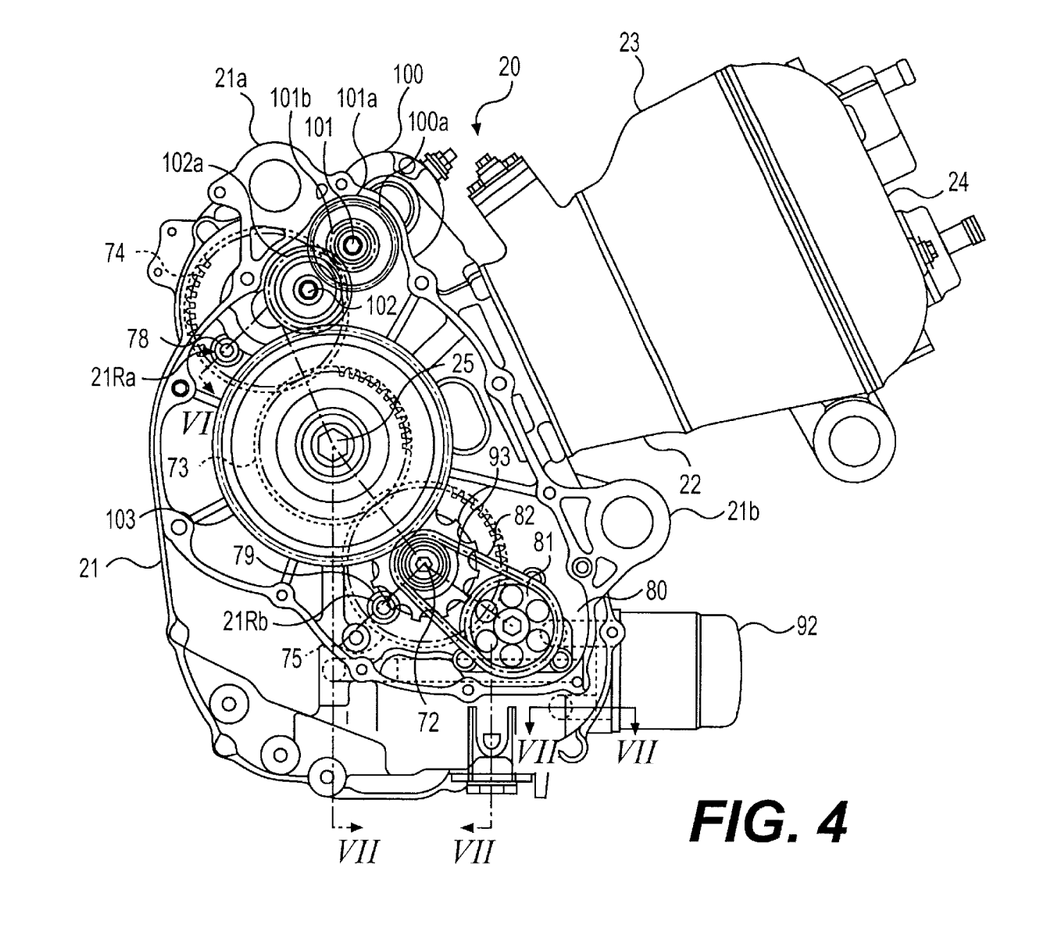
FIG. 4 is a right side view of an internal combustion engine having a case cover which is removed.

As shown in FIG. 4, the driving gear 100a of the driving shaft of the starter motor 100 engages with the large gear 101a of the first counter shaft 101. A small gear 101b provided as a unit with the large gear 101a engages with a gear 102a of the second countershaft 102. The gear 102a engages with a driven gear 103 fitted on the crankshaft 25, the driven gear 103 taking a position adjacent the outer rotor 29a of the AC generator 29. Thus the rotation of the driving shaft of the starter motor 100 is transmitted to the crankshaft 25 for startup of the engine.

The starter motor 100 is disposed before the mounting bracket 21a at the same height, and it does not protrude upward excessively. The mounting bracket 21a and the starter motor 100 are disposed within the maximum width "K" of the rotational locus of the crank weight 25a in the longitudinal direction of the frame. Thus, they do not affect the length of the internal combustion engine 20 and contribute to the reduction of the frame size.

A pump-driving shaft 80 is disposed in parallel with, in front of and below the lower balancer shaft 72. A chain 82 is wound around a driving sprocket wheel 93 fitted on the right end of the lower balancer shaft 72 protruding through the right crankcase half 21R and a driven sprocket wheel 81 fitted on the right end of the pump-driving shaft 80 (see FIGS. 4 and 7).

Figure 7:
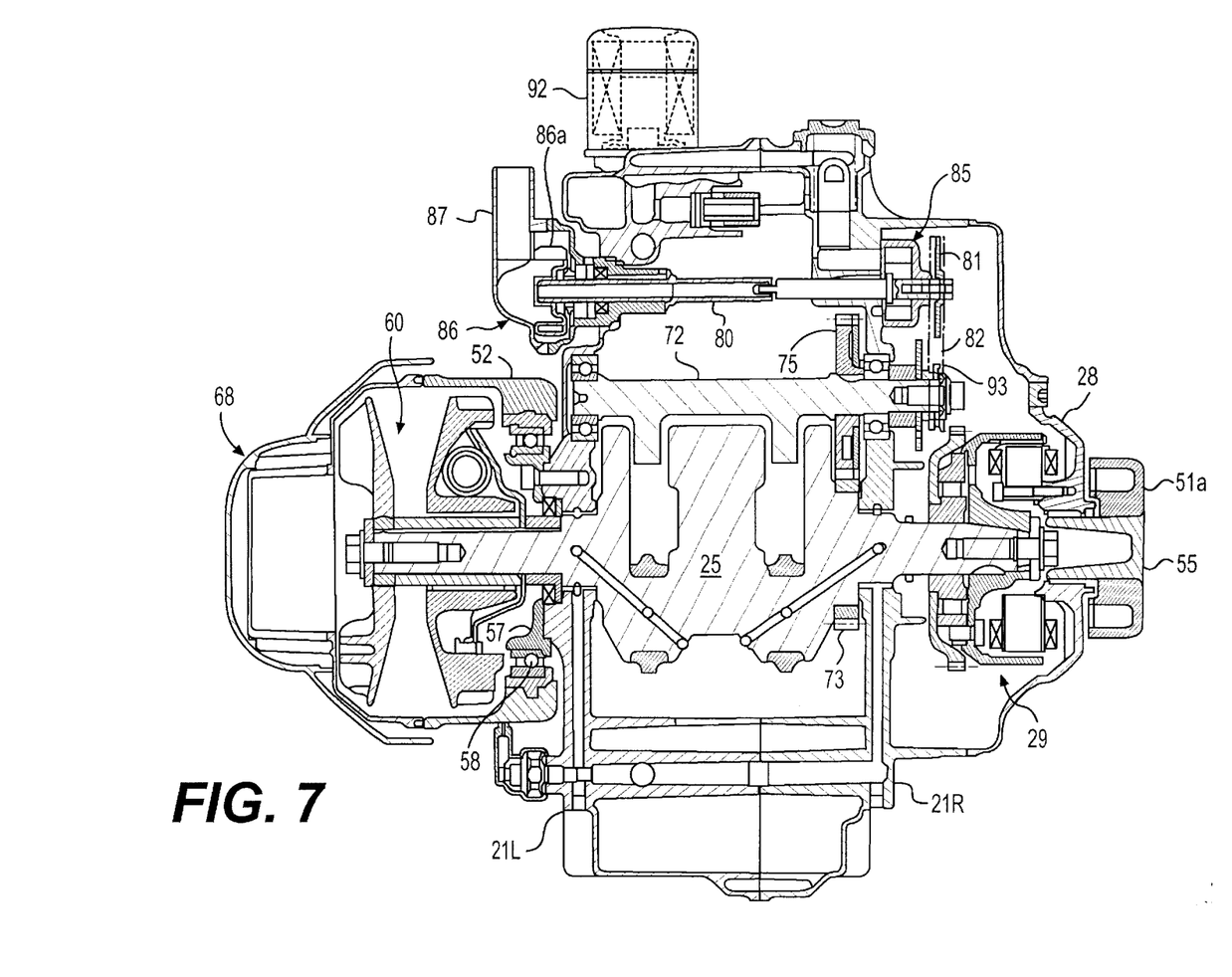
FIG. 7 is a cross-sectional view of the device in FIG. 4 sectioned along the line VII—VII of FIG. 4.

Thus, the crankshaft 25 rotates the pump-driving shaft 80 through the lower balancer shaft 72.

An oil pump 85 is disposed between the right crankcase half 21R and the driven sprocket wheel 81 on the right end of the pump-driving shaft 80. A water pump 86 is fitted on the part of the pump-driving shaft 80 protruding through the left crankcase half 21L (see FIG. 7).

As shown in FIG. 7, a suction-connecting pipe 87 protrudes forward from the space to the left of the center of the impeller 86a of the water pump 86. A discharge-connecting pipe 88 protrudes upward from one side of the impeller 86a. A hose 89 connects the discharge-connecting pipe 88 and a connecting pipe 91 protruding from a cooling-water inlet provided on the left side of the cylinder block 22 (see FIG. 2).

An oil filter 92 protrudes forward from the lower part of the front wall of the left crankcase half 21L.

As described above, the oil pump 85 and the water pump 86 are provided at the ends of the pump-driving shaft 80 which is disposed close to, in front of and below the lower balancer shaft 72. Since the oil pump 85 and the water pump 86 are disposed before and close to the lower balancer shaft 72, they do not affect the ground clearance of the frame and, hence, do not impede the making of the internal combustion engine 20 small.

The balancer driven gears 74 and 75, which are fitted on the balancer shafts 71 and 72 and engage with the driving gear 73 fitted to the crankshaft 25 to transmit the rotation of the crankshaft 25 to the upper and lower balancer shafts 71 and 72, are scissors gears for smooth rotational transmission. Each of the balancer driven gears 74 and 75 include two spur gears that are supported side by side and urged to slip the tooth profiles of one gear and the other out of an exactly overlapping state.

Figure 8:
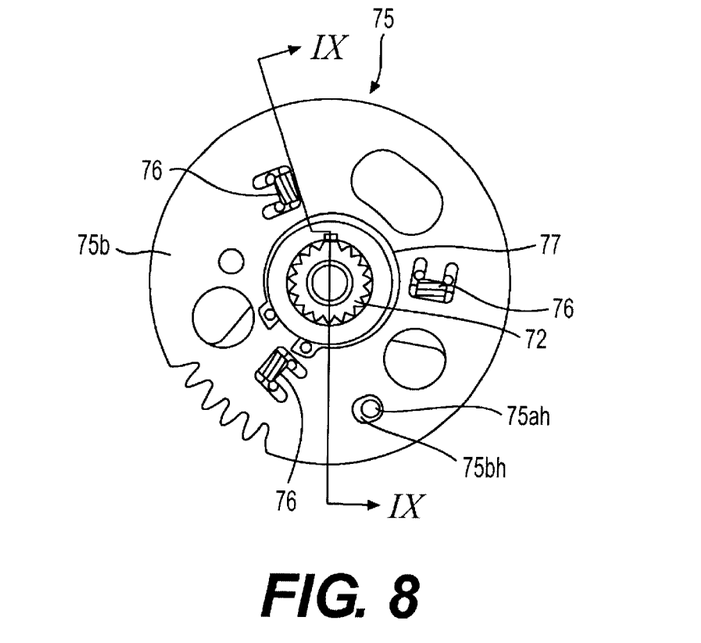
FIG. 8 is a right side view of a balancer shaft and a balancer driven gear.
Figure 9:
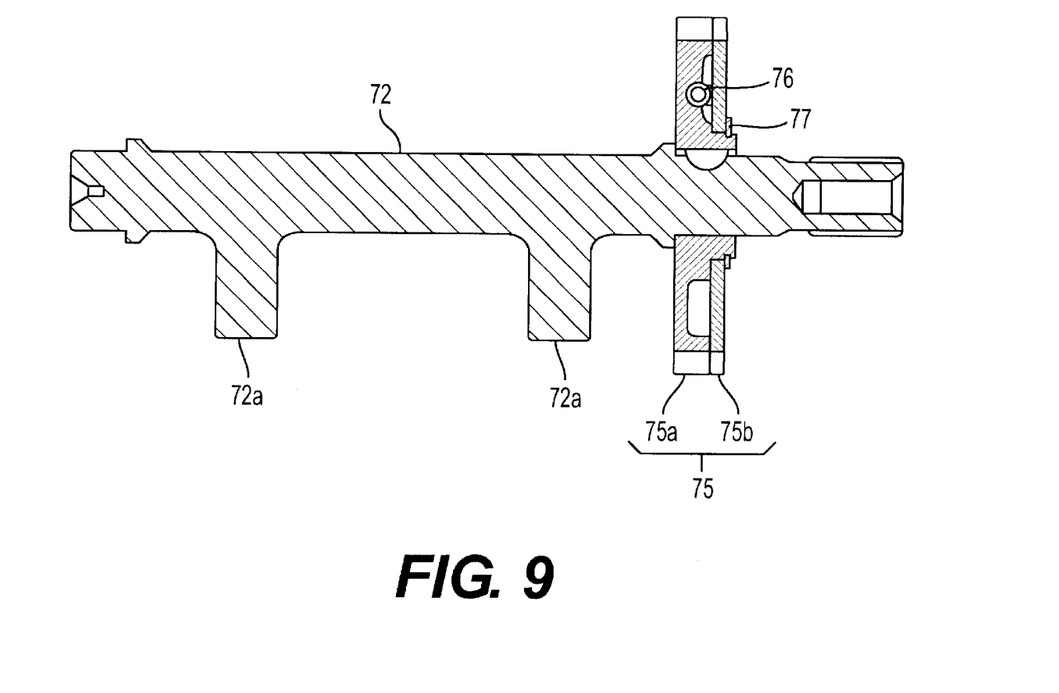
FIG. 9 is a cross-sectional view of the device in FIG. 8 sectioned along the line IX—IX of FIG. 8.

Referring to FIGS. 8 and 9, the detailed construction of the balancer driven gear 75 fitted on the lower balancer shaft 72 will be described below.

The balancer driven gear 75 comprises a main gear 75a, which is a spur gear, and a sub-gear 75b, which is a thin spur gear. The main gear 75a and the sub-gear 75b are supported side-by-side and journaled so as to be freely rotatable relatively to each other.

The sub-gear 75b is journaled on the axle portion of the main gear 75a and prevented from coming off the axle portion by a circlip, or a snap ring, 77 so as to be freely rotatable relatively to the main gear 75a. Three springs 76 are fitted between the main gear 75a and the sub-gear 75b to urge the tooth profiles of the main gear 75a and the sub-gear 75b out of an exactly overlapping state.

A threaded hole 75ah is formed at a prescribed point on the main gear 75a, and an oval hole 75bh is formed at a prescribed point on a concentric circle on the sub-gear 75b. A positioning pin 79, i.e., a bolt having a hexagon socket head is screwed into the threaded hole 75ah through the oval hole 75bh so that the head of the positioning pin or the bolt 79 can check the turning of the sub-gear 75b relative to the main gear 75a and, thereby, fix the overlap of the tooth profiles of the main gear 75a and the sub-gear 75b in a certain state (see FIG. 6).

Therefore, by screwing the positioning pin or the bolt 79 into the threaded hole 75ah to fix the tooth profiles of the main gear 75a and the sub-gear 75b in the exactly overlapping state when the balancer driven gear 75 is installed together with the lower balancer shaft 72, the balancer driven gear 75 can easily be brought into engagement with the driving gear 73 of the crankshaft 25. Thus, the assembling efficiency can be increased.

The balancer driven gear 74 fitted on the upper balancer shaft 71 is a scissors gear with the same construction as the balancer driven gear 75. The main gear 74a and the sub-gear 74b can be fixed by a bolt 78 in the exactly overlapping state of the tooth profiles of the main gear 74a and the sub-gear 74b.

The bolts 78 and 79 of the balancer driven gears 74 and 75 are also used for the phase matching of the upper and lower balancers 71a and 72a when they are built in.

As shown in FIG. 5 (the right crankcase half 21R is removed), the phase matching of the balancers 71a and 72a is made so that bolts 78 and 79 are located at a given angled position by engaging the balancer driven gears 74 and 75 with the driving gear 73 of the crankshaft 25 when the angle of the crankshaft 25 locates the pistons 26 and 26 at the top dead center position.

Figure 6:
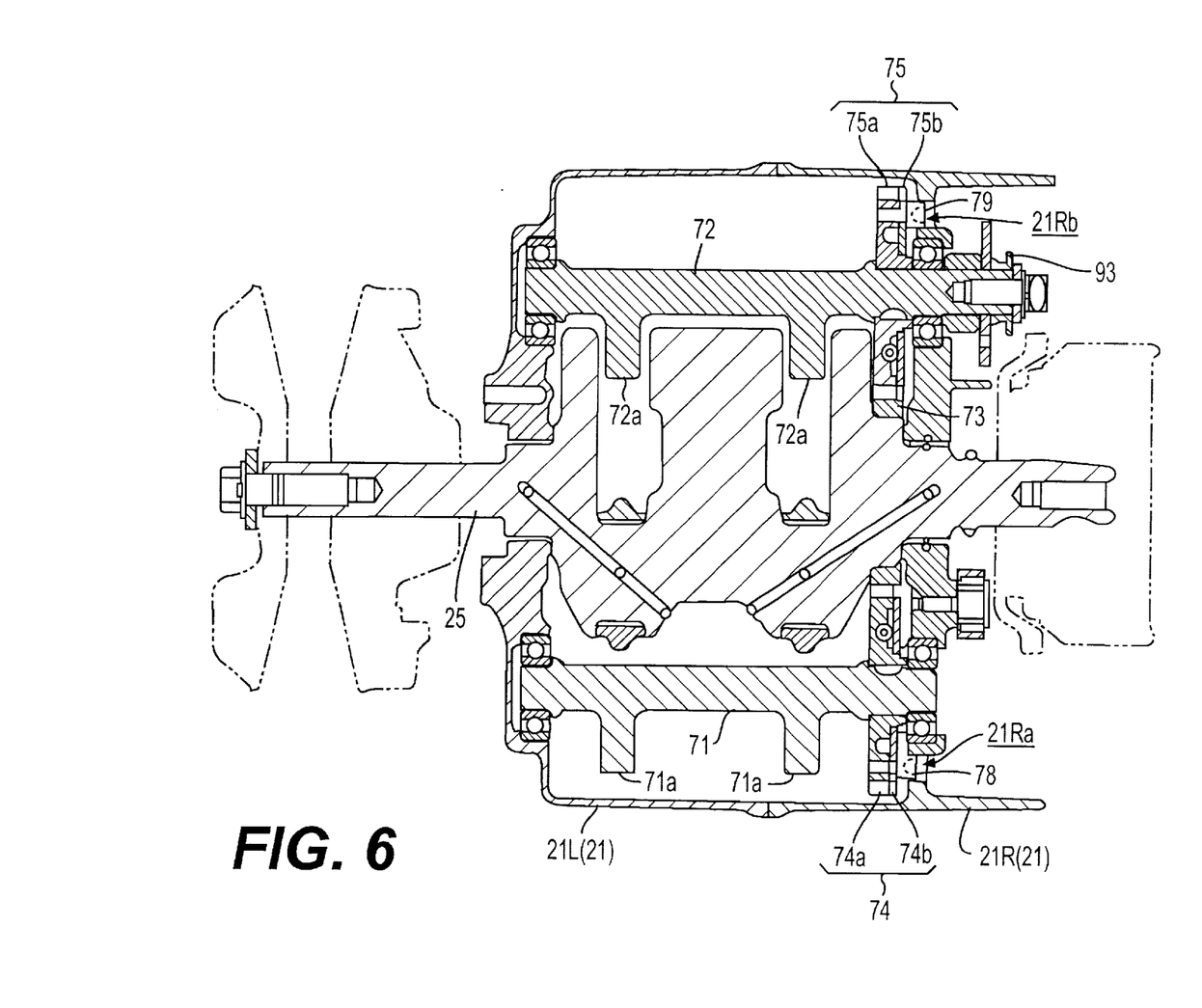
FIG. 6 is a cross-sectional view of the device in FIG. 4 sectioned along the line VI—VI of FIG. 4.

If the bolts 78 and 79 are located at the given angled position, as shown in FIGS. 4 and 6, when the right crankcase half 21R and the left crankcase half 21L are put together, heads of the bolts 78 and 79 fit position-matching holes 21Ra and 21Rb and are inserted into respective holes 21Ra and 21Rb provided on a side wall of the right crankcase half 21R.

Therefore, after the balancers 71a and 72a are phase-matched, and the crankshaft 25 and the balancer shaft 71 and 72 are fitted onto the left crankcase half 21L, when the right crankcase half 21R is to be fitted, the right crankcase half 21R and the left crankcase half 21L can be put together so long as the heads of the bolts 78 and 79 fit the position-matching holes 21Ra and 21Rb. Thus, it can easily be made sure that the balancers 71a and 72a are precisely phase-matched.

Furthermore, when the balancers 71a and 72a are not precisely position-matched, the right crankcase half 21R and the left crankcase half 21L cannot be put together.

Thus, after the right crankcase half 21R and the left crankcase half 21L are put together and fastened, the bolts 78 and 79 can be removed through the position-matching holes 21Ra and 21Rb of the right crankcase half 21R.

Once the bolts 78 and 79 are removed, the springs 76 urge the main gears 74a and 75a as well as the sub-gears 74b and 75b of the balancer driven gears 74 and 75 to slip the tooth profiles of one gear and the other gear out of the exactly overlapping state. Since teeth of the driving gear 73 of the crankshaft 25 are expanded by the action of the spring 76 and engage with each other, the rotation is transmitted smoothly.

If a worker forgets to remove the bolts 78 and 79, heads of the bolts 78 and 79 are still in the position-matching holes 21Ra and 21Rb of the right crankcase half 21R. Since the balancer driven gears 74 and 75 are prevented from rotating, it can be easily that the bolts 78 and 79 have not been removed. The bolts 78 and 79 can then be removed by making use of the position-matching holes 21Ra and 21Rb without removing the right crankcase half 21R.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A balancer-fitting configuration for an internal combustion engine with a crankcase, a crankshaft, and a crank weight for a vehicle with a rear wheel disposed close to a rear of the crankcase, comprising:

a cylinder axial line of the internal combustion engine is inclined generally horizontally, and paired balancers, one above and the other below the crankshaft, are disposed generally within a maximum width of a locus of the crank weight in the longitudinal direction of the vehicle; and a starter is disposed in a vicinity of an upper of the balancers, and accessories are disposed in a vicinity of a lower of the balancers.

2. The balancer-fitting configuration for an internal combustion engine according to claim 1, wherein said accessories include an oil pump.

3. The balancer-fitting configuration for an internal combustion engine according to claim 1, further comprising:

a shaft of the upper balancer is disposed behind the crankshaft; and the starter is disposed before the upper balancer shaft.

4. The balancer-fitting configuration for an internal combustion engine according to claim 1, wherein said accessories are disposed before a shaft of the lower balancer.

5. The balancer-fitting configuration for an internal combustion engine according to claim 2, wherein said oil pump is disposed before a shaft of the lower balancer.

6. The balancer-fitting configuration for an internal combustion engine according to claim 1, wherein the rear wheel of the vehicle disposed close to the rear of the crankcase is journaled on an axle at a rear end of an arm which swings about a shaft in axial alignment with the crankshaft.

7. The balancer-fitting configuration for an internal combustion engine according to claim 2, wherein a rear wheel of the vehicle disposed close to the rear of the crankcase is journaled on an axle at a rear end of an arm which swings about a shaft in axial alignment with the crankshaft.

8. The balancer-fitting configuration for an internal combustion engine according to claim 3, wherein a rear wheel of the vehicle disposed close to the rear of the crankcase is journaled on an axle at a rear end of an arm which swings about a shaft in axial alignment with the crankshaft.

9. The balancer-fitting configuration for an internal combustion engine according to claim 4, wherein a rear wheel of the vehicle disposed close to the rear of the crankcase is journaled on an axle at a rear end of an arm which swings about a shaft in axial alignment with the crankshaft.

10. A balancer-fitting configuration for an internal combustion engine including a crankcase, a crankshaft, and a balancer having a shaft parallel to the crankshaft, comprising:

a driving gear fitted on the crankshaft;

a balancer driven gear fitted on the balancer shaft, said driving gear and said balancer driven gear engaging with each other to transmit motive power;

said balancer driven gear is a scissors gear comprising two spur gears located together side by side, each of said two spur gears having tooth profiles biased to slip out of an exactly overlapping state with each other; and a positioning pin for fixing said two spur gears to have the tooth profiles in an exactly overlapping state and positioning the balancer driven gear with respect to the crankcase.

11. The balancer-fitting configuration for an internal combustion engine according to claim 10, further comprising:

a through hole formed at a position on the crankcase corresponding to the position of said positioning pin; and said positioning pin is removable through said through hole.

12. An internal combustion engine for a vehicle having a rear wheel disposed close to a rear of a crankcase of the internal combustion engine, comprising:

a crankcase;

a crankshaft;

a crank weight;

a cylinder axial line inclined generally horizontally, and paired balancers, one above and the other below the crankshaft, are disposed generally within a maximum width of a locus of the crank weight in the longitudinal direction of the vehicle; and a starter is disposed in a vicinity of an upper of the balancers, and accessories are disposed in a vicinity of a lower of the balancers.

13. The internal combustion engine according to claim 12, wherein said accessories include an oil pump.

14. The internal combustion engine according to claim 12, further comprising:

a shaft of the upper balancer is disposed behind the crankshaft; and the starter is disposed before the upper balancer shaft.

15. The internal combustion engine according to claim 12, wherein said accessories are disposed before a shaft of the lower balancer.

16. The internal combustion engine according to claim 13, wherein said oil pump is disposed before a shaft of the lower balancer.

17. The internal combustion engine according to claim 12, wherein the rear wheel of the vehicle disposed close to the rear of the crankcase is journaled on an axle at a rear end of an arm which swings about a shaft in axial alignment with the crankshaft.

18. The internal combustion engine according to claim 13, wherein a rear wheel of the vehicle disposed close to the rear of the crankcase is journaled on an axle at a rear end of an arm which swings about a shaft in axial alignment with the crankshaft.

19. An internal combustion engine, comprising:

a crankcase;

a crankshaft;

a balancer having a shaft parallel to the crankshaft;

a driving gear fitted on the crankshaft;

a balancer driven gear fitted on the balancer shaft, said driving gear and said balancer driven gear engaging with each other to transmit motive power;

said balancer driven gear is a scissors gear comprising two spur gears located together side by side, each of said two spur gears having tooth profiles biased to slip out of an exactly overlapping state with each other; and a positioning pin for fixing said two spur gears to have the tooth profiles in an exactly overlapping state and positioning the balancer driven gear with respect to the crankcase.

20. The internal combustion engine according to claim 19, further comprising:

a through hole formed at a position on the crankcase corresponding to the position of said positioning pin; and said positioning pin is removable through said through hole.

* * * * *